US008073206B2

(12) United States Patent
Kamiyama et al.

(10) Patent No.: US 8,073,206 B2
(45) Date of Patent: Dec. 6, 2011

(54) FACE FEATURE COLLATOR, FACE FEATURE COLLATING METHOD, AND PROGRAM

(75) Inventors: Hirotaka Kamiyama, Kanagawa (JP); Hitoshi Yashio, Tokyo (JP)

(73) Assignee: Panasonic Corporation, Osaka (JP)

( * ) Notice: Subject to any disclaimer, the term of this patent is extended or adjusted under 35 U.S.C. 154(b) by 1053 days.

(21) Appl. No.: 11/718,738

(22) PCT Filed: Nov. 16, 2005

(86) PCT No.: PCT/JP2005/021036
§ 371 (c)(1),
(2), (4) Date: May 7, 2007

(87) PCT Pub. No.: WO2006/054598
PCT Pub. Date: May 26, 2006

(65) Prior Publication Data
US 2009/0052747 A1 Feb. 26, 2009

(30) Foreign Application Priority Data
Nov. 16, 2004 (JP) .................. 2004-331894

(51) Int. Cl.
*G06K 9/00* (2006.01)
*G06K 9/48* (2006.01)
(52) U.S. Cl. .......... 382/118; 382/103; 382/199; 348/77; 348/143
(58) Field of Classification Search .................. 382/115, 382/103, 118, 181, 190, 195, 199, 117, 282, 382/296, 312, 209; 348/77, 143, 153
See application file for complete search history.

(56) References Cited

U.S. PATENT DOCUMENTS

| | | | | |
|---|---|---|---|---|
| 5,331,544 A | * | 7/1994 | Lu et al. | 705/10 |
| 5,604,551 A | * | 2/1997 | Choi et al. | 396/58 |
| 6,725,383 B2 | * | 4/2004 | Kyle | 726/7 |
| 6,856,935 B1 | * | 2/2005 | Fehlis et al. | 702/152 |

(Continued)

FOREIGN PATENT DOCUMENTS

JP 11-175730 7/1999

(Continued)

OTHER PUBLICATIONS

Wu et al. "Facial Feature Extraction and Face Verification" IEEE (1996) Proceedings of ICPR, pp. 1-5.*

(Continued)

*Primary Examiner* — Jason M Repko
*Assistant Examiner* — Mia M Thomas
(74) *Attorney, Agent, or Firm* — Pearne & Gordon LLP

(57) ABSTRACT

The invention provides a facial feature verification apparatus capable of synthesizing an image suitable for verification to identify a person subjected to surveillance whom surveillance staff desires to watch. The facial feature verification apparatus includes a plurality of pickup units 1, a pickup controlling unit 2 for controlling the pickup units 1, a displaying unit 3 for displaying images picked up by the pickup units 1, and a verifying unit 4 for detecting a person from the picked up images, extracting a facial image by determining a face area of the person, extracting a facial image from the images picked up by the pickup units 1, synthesizing a plurality of facial features by extracting facial features from the extracted facial images, and verifying the synthesized facial features with the facial features enrolled in advance in a facial image database 5.

8 Claims, 7 Drawing Sheets

U.S. PATENT DOCUMENTS

| | | | |
|---|---|---|---|
| 6,879,709 B2* | 4/2005 | Tian et al. | 382/118 |
| 7,184,602 B2* | 2/2007 | Cohen et al. | 382/243 |
| 7,212,655 B2* | 5/2007 | Tumey et al. | 382/116 |
| 7,218,760 B2* | 5/2007 | Gu et al. | 382/118 |
| 7,284,698 B2* | 10/2007 | Sogo | 235/382 |
| 7,400,741 B2* | 7/2008 | Hoshino | 382/100 |
| 7,420,601 B2* | 9/2008 | Hong | 348/252 |
| 7,421,097 B2* | 9/2008 | Hamza et al. | 382/118 |
| 7,653,220 B2* | 1/2010 | Nishimori et al. | 382/118 |
| 7,693,310 B2* | 4/2010 | Kato et al. | 382/118 |
| 7,809,166 B2* | 10/2010 | Funayama et al. | 382/107 |
| 2002/0003891 A1* | 1/2002 | Hoshino | 382/100 |
| 2002/0152010 A1* | 10/2002 | Colmenarez et al. | 701/36 |
| 2002/0175997 A1* | 11/2002 | Takata et al. | 348/143 |
| 2002/0181784 A1* | 12/2002 | Shiratani | 382/218 |
| 2002/0184098 A1* | 12/2002 | Giraud et al. | 705/14 |
| 2002/0190119 A1* | 12/2002 | Huffman | 235/375 |
| 2003/0039380 A1* | 2/2003 | Sukegawa et al. | 382/118 |
| 2004/0028260 A1* | 2/2004 | Higaki et al. | 382/118 |
| 2004/0183951 A1* | 9/2004 | Lee | 348/652 |
| 2004/0218827 A1* | 11/2004 | Cohen et al. | 382/243 |
| 2005/0094849 A1* | 5/2005 | Sung et al. | 382/103 |
| 2005/0196021 A1* | 9/2005 | Seto et al. | 382/118 |
| 2005/0197923 A1* | 9/2005 | Kilner et al. | 705/27 |
| 2005/0201594 A1* | 9/2005 | Mori et al. | 382/107 |
| 2005/0205668 A1* | 9/2005 | Sogo | 235/382 |
| 2006/0210167 A1* | 9/2006 | Inoue et al. | 382/190 |
| 2007/0076921 A1* | 4/2007 | Living | 382/118 |
| 2007/0086626 A1* | 4/2007 | Mariani et al. | 382/115 |
| 2007/0122005 A1* | 5/2007 | Kage et al. | 382/115 |
| 2007/0127787 A1* | 6/2007 | Castleman et al. | 382/118 |
| 2007/0223827 A1* | 9/2007 | Nishimori et al. | 382/249 |
| 2009/0009598 A1* | 1/2009 | Sotodate | 348/143 |
| 2009/0052747 A1* | 2/2009 | Kamiyama et al. | 382/118 |
| 2009/0087041 A1* | 4/2009 | Hasebe et al. | 382/118 |
| 2009/0273667 A1* | 11/2009 | Nozaki et al. | 348/77 |
| 2010/0067751 A1* | 3/2010 | Aoki | 382/118 |
| 2010/0111408 A1* | 5/2010 | Matsuhira et al. | 382/164 |
| 2010/0272328 A1* | 10/2010 | Lee | 382/118 |

FOREIGN PATENT DOCUMENTS

| | | |
|---|---|---|
| JP | 2000-331207 | 11/2000 |
| JP | 2002-77889 | 3/2002 |
| JP | 2002-288670 A | 10/2002 |
| JP | 2004-072628 | 3/2004 |

OTHER PUBLICATIONS

Mahoor et al. "Improved Active Shape Model for Facial Feature Extraction in Color Images" Jour of Multimedia, Vo.1, No. 4, Jul. 2006, pp. 1-8.*

Jiao et al. "The Anatomy of a Multi Camera Video Surveillance System" Multimedia Systems Oct. 2004, pp. 144-163.*

Campadelli et al. "Automatic Facial Feature Extraction for Face Recognition" Face Recognition Vienna, Austria, Jun. 2007, pp. 1-28.*

International Search Report (PCT/JP2005/021036) dated Jan. 10, 2006.

English translation of the Japanese Office action dated May 14, 2008.

* cited by examiner

FACE FEATURE COLLATOR, FACE FEATURE COLLATING METHOD, AND PROGRAM

TECHNICAL FIELD

The present invention relates to a facial feature verification apparatus capable of verifying faces in regard to those enrolled in advance, for example, when keeping watch on suspicious persons by using a plurality of monitor cameras, in particular to a facial feature verification apparatus capable of synthesizing facial images and verifying the same when carrying out face verification to identify a person subjected to surveillance, a facial feature verification method used therefor, and a program executed by a computer in order to carry out facial feature verification.

BACKGROUND ART

Conventionally, in a surveillance system using surveillance cameras, surveillance staff observes a desired site by selecting an optional one of a plurality of installed surveillance cameras using a controller based on images sent from surveillance cameras installed at a plurality of locations. However, where surveillance is carried out for a desired site, it cannot be said that the surveillance camera selected by the surveillance staff picks up the most suitable image.

Therefore, as a method for improving this, for example, a surveillance system described in Patent Document 1 has been known. That is, cameras are installed at a plurality of positions, and the camera nearest to the position instructed by surveillance staff is automatically selected from a plurality of gyratory cameras and is caused to display a picked up image.
Patent Document 1: JP-A-2002-77889

DISCLOSURE OF THE INVENTION

Problems to be Solved by the Invention

However, as in the prior art, even if surveillance staff selects the camera, for example, nearest to a person subjected to surveillance, as a camera selected by the surveillance staff from a plurality of cameras described above, this camera does not necessarily display the optimal image. That is, the optimal image means an image by which a person subjected to surveillance can be specified (identified).

Therefore, it changes according to situations whether the optimal camera to pick up a person subjected to surveillance is the camera nearest to the position instructed by surveillance staff. Therefore, there may be cases where the surveillance staff cannot soon pick up a person subjected to surveillance, and further there is a shortcoming in that it is not clear whether an image suitable to identify a person subjected to surveillance is acquired at high reliability.

The present invention is developed in view of the above-described situations. It is therefore an object of the present invention to provide a facial feature verification apparatus capable of synthesizing appropriate images necessary to identify (verify) a person subjected to surveillance by surveillance staff, a facial feature verification method therefor, and a program therefor.

Means for Solving the Problem

A facial feature verification apparatus according to the present invention includes:
a plurality of pickup units;
a pickup controlling unit which controls the pickup units;
a displaying unit which displays images picked up by the pickup units; and
a verifying unit which verifies the picked up images with image data enrolled in advance,
wherein the verifying unit includes:
a person detecting portion which detects a person in the picked up images;
a facial feature extracting portion which determines face areas from the picked up images regarding the detected person to extract facial images;
a facial feature synthesizing portion which synthesizes the extracted facial features; and
a verification portion which verifies the synthesized facial features with a facial image enrolled in advance in a facial image database.

With this configuration, when surveillance staff selects a person subjected to surveillance in order to pick up a person subjected to surveillance by a plurality of pickup units, it is possible to observe pictures taken at various angles by photographable pickup unit. Also, if it is determined that an image picked up by a specified pickup unit is not suitable for verification, the image can be synthesized to an image suitable for verification, wherein the accuracy of verification can be improved where the verification is not successful with a single pickup unit.

In addition, a facial feature verification apparatus according to the present invention is featured in that the pickup controlling unit includes an external I/F portion which serves as an interface with an external device for carrying out control externally, a coordinates conversion portion which converts an image coordinate inputted by the external device to a predetermined world coordinate, and a pickup device controlling portion which calculates a swivel angle for actuating the pickup units.

With this configuration, if surveillance staff selects, using an external device, a person subjected to surveillance in order to continuously pick up a person subjected to surveillance by means of the pickup units, it is possible to continuously observe pictures taken at various angles by photographable pickup unit.

A facial feature verification apparatus according to the present invention is characterized in that the verification portion includes a pickup unit selecting portion which selects, among the pickup units, the pickup unit for position detection, which detects a position of the detected person, and the pickup unit for pursuit, which carries out pursuit of the detected person.

With this configuration, since surveillance staff selects a person to be observed in order to continuously pick up a person subjected to surveillance by a plurality of pickup units, it is possible to continuously observe the pictures taken at various angles by a photographable pickup unit. Further, if it is determined that an image picked up by a specified pickup unit is not suitable for verification, the image can be synthesized to an image suitable for verification, wherein the accuracy of verification can be improved where the verification is not successful with a single pickup unit.

In addition, a facial feature verification method, includes:
providing a plurality of pickup units, a pickup controlling unit which controls the pickup units, a displaying unit which displays images picked up by the pickup units, and a verifying unit which verifies the picked up images with image data enrolled in advance;
detecting a person in the picked up images;
determining face areas from the picked up images regarding the detected person to extract facial images;

extracting facial features from the extracted facial images; synthesizing the extracted facial features; and verifying the synthesized facial features with a facial image in a facial image database enrolled in advance.

With this method, if it is determined that an image picked up by specified pickup unit is not suitable for verification, the image can be synthesized to an image suitable for verification, wherein the accuracy of verification can be improved where the verification is not successful with a single pickup unit.

Further, a program according to the present invention employs: a plurality of pickup units; pickup controlling means for controlling the plurality of pickup means; means for displaying images picked up by the plurality of pickup means; and means for verifying the above-described picked-up images with image data enrolled in advance; and carries out an operation for verifying facial features by which a computer is caused to execute the steps of: detecting a person from the picked up images; extracting facial images by determined face areas from the picked up images of the detected person; extracting the facial features from the extracted facial images; synthesizing the extracted facial features; and verifying the synthesized facial features with the facial image database enrolled in advance.

With this configuration, where the program for causing a computer to carry out a facial image synthesizing method by which a plurality of facial features are synthesized is stored in a recording medium, it can be incorporated in any type of device.

Effects of the Invention

According to the present invention, since a pickup controlling unit which can control all the pickup units capable of selecting and photographing a person subjected to surveillance and displayed on the displaying unit is provided, and a synthesizing unit is provided, the synthesizing unit synthesizing facial images picked up by a plurality of pickup units, the accuracy of verification can be improved by enabling verification where the verification is not successful with a single pickup unit.

Figure 1:
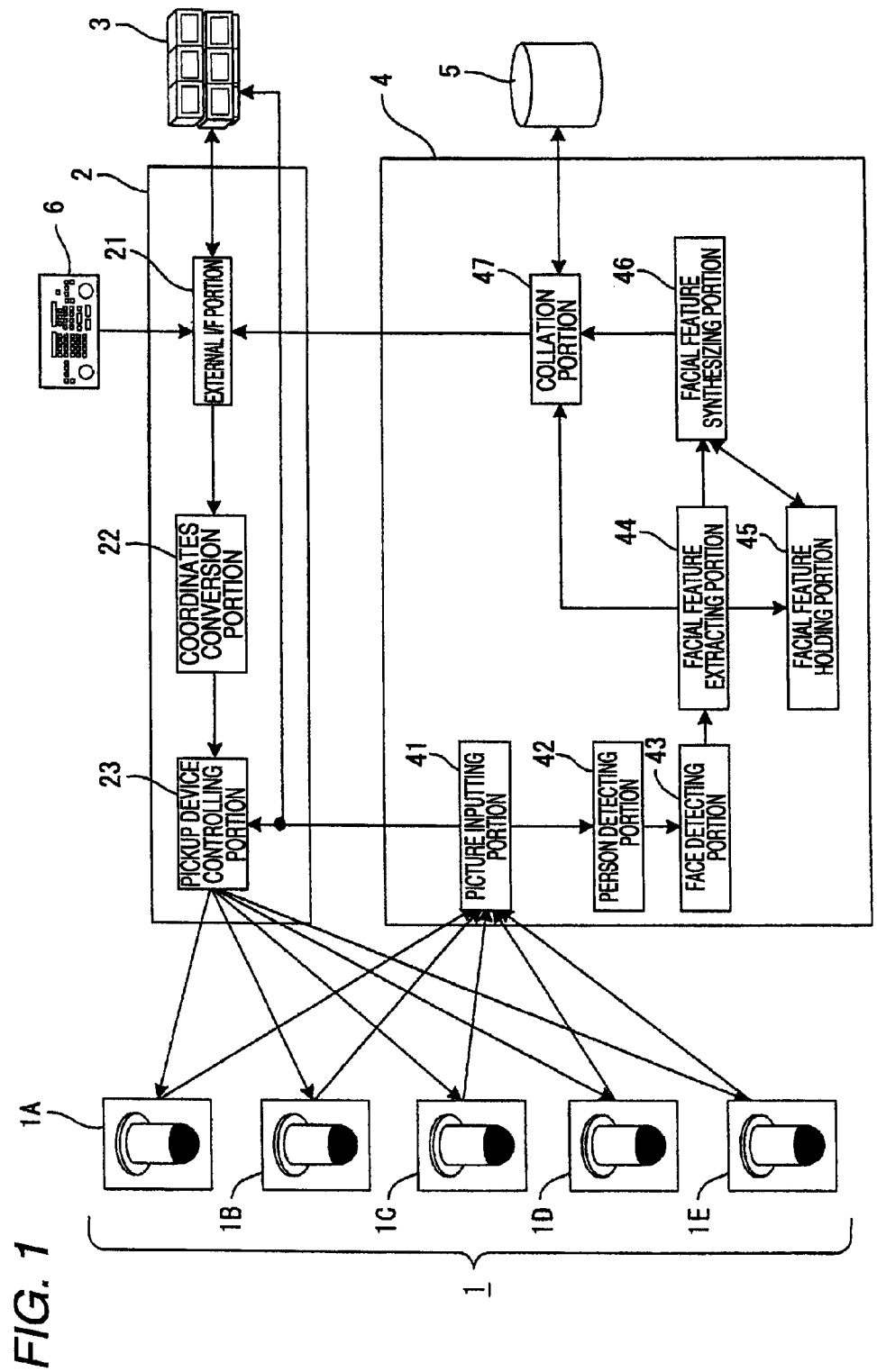
FIG. 1 is a configurational block diagram of a facial feature verification apparatus according to A first embodiment of the present invention.

DESCRIPTION OF REFERENCE NUMERALS 1A through 1E pickup units
2 pickup controlling unit
21 external I/F portion
22 coordinates conversion portion
23 pickup controlling portion
3 displaying unit
4 verifying unit
41 picture inputting portion
42 person detecting portion
43 face detecting portion
44 facial feature extracting portion
45 facial feature holding portion
46 facial feature synthesizing portion
47 verification portion
48 pickup unit selecting portion
5 facial image database
6 external device

BEST MODE FOR CARRYING OUT THE INVENTION

Hereinafter, a detailed description is given of embodiments of the present invention with reference to the accompanying drawings.

First Embodiment

FIG. 1 shows a configurational structure of a facial feature verification apparatus according to the present invention, which includes a plurality of pickup units 1, a pickup controlling unit 2 for controlling the pickup units 1, a displaying unit 3 for displaying images picked up by the pickup units 1, and a verifying unit 4 for detecting a person from the picked up images, extracting facial images by determining a face area of the person, extracting facial features from a plurality of extracted facial images and synthesizing a plurality of facial features, and verifying the same with the facial features enrolled in advance in a facial image database 5.

The pickup units are configured by general surveillance cameras (hereinafter called a camera) 1A through 1E such as stationary cameras and rotating cameras capable of picking up pickup areas which are set in advance.

The pickup controlling unit 2 includes a external I/F portion 21 that is an interface to an external device 6 such as a controller, a coordinates conversion portion 22 for converting image coordinates inputted by the external device 6 to world coordinates comprehensible by the entirety of the facial feature verification system, and a pickup controlling portion 23 for calculating a swivel angle to actuate the pickup units 1.

The details of the verifying unit 4 will be described later. However, the verifying unit 4 includes a picture input portion 41, a person detecting portion 42 for detecting a person from picked up images, a face detecting portion 43, a face extracting portion 44 for extracting facial images by determining the face areas of a person, a facial feature extracting portion 45 for extracting facial features from a plurality of extracted facial images, a facial feature synthesizing portion 46 for synthesizing a plurality of extracted facial features, and a verification portion 47 for verifying the facial features with the facial features enrolled in advance.

Next, a description is given of actions of the present embodiment.

When surveillance staff selects a person from subjects for surveillance which are displayed on the displaying unit 3, by using the external device 6 such as a controller, image coordinates are outputted to the external I/F portion 21, and next, the image coordinates are outputted to the coordinates converting portion 22, and a process of converting the image coordinates to the world coordinates is carried out. Also, the world coordinates means coordinates used for expressing the interior of space by terms of coordinates where the position of the camera is assumed to be the origin [0,0,0].

Here, where the image coordinates are [Xc, Yc, Zc], and the world coordinates are [Xm, Ym, Zm], the world coordinates are principally determined by the following expression.

[Expression 1]

$$\begin{pmatrix} x_m \\ Y_m \\ Z_m \\ 1 \end{pmatrix} = \begin{pmatrix} R_{11} & R_{12} & R_{13} & t_x \\ R_{21} & R_{22} & R_{23} & t_y \\ R_{31} & R_{32} & R_{33} & t_z \\ 0 & 0 & 0 & 1 \end{pmatrix} \begin{pmatrix} x_c \\ Y_c \\ Z_c \\ 1 \end{pmatrix} \quad (1)$$

That is, coefficients R11, R12, R13, R21, R22, R23, R31, R32, R33, tx, ty and tz, which are shown in Expression 1, are obtained, and are converted to the world coordinates. However, marks are put on the installation sites of surveillance cameras, and a plurality of combinations of image coordinates and world coordinates of the marks of the installation sites are prepared in advance, and these coefficients can be obtained based on a multi-dimension simultaneous equation by calculating Expression 1.

If the world coordinates of a person designated by surveillance staff as a subject for surveillance are calculated, the world coordinates are outputted to the pickup unit controlling portion 23. The pickup unit controlling portion 23 assesses whether the respective cameras 1A through 1E are capable of picking up an area including the world coordinates in which the subject for surveillance exists. In this method, assessment is enabled if the respective pickup units 1 hold photographable areas in advance when installing the same. Where the pickup is enabled as the result of assessment, the pickup units are moved by calculating the swivel angles of pan angles and tilt angles of the pickup units 1 based on the positional relationship between the presetting positions, which are a pickup angles of the pickup units 1 in a default state, and the world coordinates of the object. Thus, a person subjected to surveillance is picked up by the pickup unit 1 that are capable of picking up the person subjected to surveillance selected by the surveillance staff.

Pictures picked up by the pickup units 1 are inputted into the pickup inputting portion 41. The inputted pictures of the respective pickup units 1 are outputted to the person detecting portion 42, and a person is detected based on the pictures of the respective pickup units. Here, in regard to detection of a person, a person is determined based on that movements and changes of a picture for each of the frames, which are the minimum unit picked up by the pickup units 1, are captured, and an elliptical object exists above or on the movements and changes. Next, a face area is detected from the detected person in the face detection portion 43. Here, face detection is determined based on, for example, whether, in a state where a plurality of facial images are enrolled in advance and the face detecting portion is caused to study the same to prepare an average face, there is an area similar to a grayscale picture of the average face (that is, whether the correlation degree is high). Next, the facial feature extracting portion 44 extracts facial features such as eyes, nose, mouth, etc., which becomes the features of a face. Extraction of facial features is determined based on whether, for example, in a state where a plurality of facial features such as the right eye, the left eye, nose and mouth are enrolled previously and the facial feature extracting portion 44 is caused to study the same to prepare average features, there is an area similar to the grayscale picture of the average features (that is, whether the correlation degree is high).

Based on the result of detection of the facial features, it is determined whether the face is turned on the front. With respect to assessment of the direction of the face, for example, a plurality of front face, face turned right by 45 degrees, face turned left by 45 degrees, face inclined upward by 45 degrees, face inclined downward by 45 degrees, etc., are enrolled and studied in advance, and average faces are prepared at the respective angles, wherein it is determined in which direction the face of a person is turned, based on whether the face of the person is similar to the grayscale image of the average face (that is, whether the correlation degree is high). If it is determined that the face is turned to the front, next, the face data are transmitted to the verification portion 47, and if it is determined that the face is turned in a direction other than the front, the face data are transmitted to the next facial feature holding portion 45 and facial feature synthesizing portion 46.

First, a description is given of a case where the face is turned to the front.

Where the face is turned to the front, the face data are transmitted to the verification portion 47, and the face data are collated with facial images enrolled in the facial image database in advance. With respect to the verification method, matching is carried out in connection with the positional relationship of facial parts of, for example, eyes, nose, mouth, eyebrows, and facial profile, information of thickness and length, and features of grayscale information of the face. As a result of the verification, a enrolled image for which the matching degree is high, that is, a enrolled image that has a matching degree greater than a fixed level is outputted to the external I/F portion 21. After that, the results thereof are displayed on the displaying unit 3.

Figure 2:
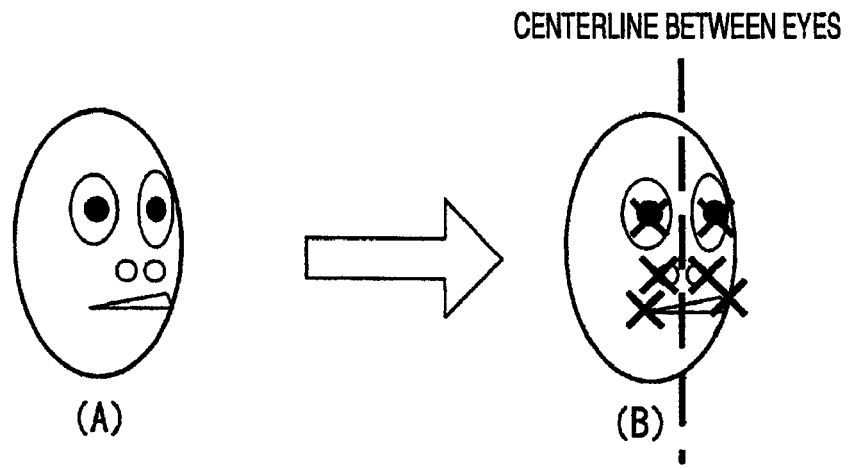
FIGS. 2(A) and 2(B) are schematic views describing a method for extracting end points to synthesize facial features according to the first embodiment of the present invention, respectively.

Next, a description is given of a method for extracting end points to synthesize facial features, using FIG. 2.

As shown in FIG. 2(A), in the case of a facial image inclined left, end points of the facial parts extracted by the method for extracting facial features are detected (as shown by the crosses X in FIG. 2(B)). This method is based on the assumption that profile lines of the facial parts extracted above are further extracted, and both ends thereof are regarded as end points. And, if the facial image is an image inclined left, an inquiry is made to the facial feature holding portion 45 for whether there is a facial image inclined in the reverse direction thereof, that is, inclined right, therein. If the features in the reverse direction are extracted, both images are next synthesized.

Figure 3:
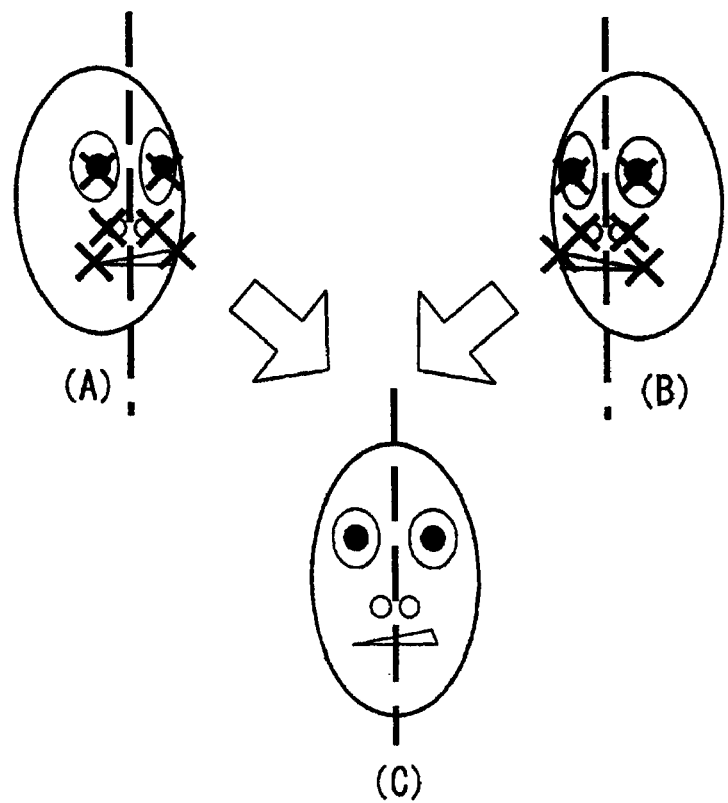
FIGS. 3(A) and 3(B) are schematic views showing facial feature synthesization according to the first embodiment of the present invention, respectively.

Next, a description is given of a method for synthesizing facial features, using FIG. 3.

First, as shown in FIGS. 3(A) and (B), two facial images turned in the reverse direction to each other are enlarged and reduced so as to become the same magnification. After that, conversion and parallel movement are carried out for synthesization so that the feature end points of the corresponding right eye, left, right nose, left nose, right mouth and left mount of both facial images overlap each other. The conversion and parallel movement are carried out by, for example, publicly known affine transformation, etc. Herein, the affine transformation is a type of transformation system in which geographical characteristics are retained, for example, points disposed on a straight line on an original figure remain on the same straight line after transformation, and parallel lines also remain parallel lines after transformation.

Also, where it is assumed that the coordinates in FIG. 3(A) are [u,v] and the coordinates in FIG. 3(B) are [x,y], the following relationship can be established.

$$u=ax+by+c \quad (2)$$

$$v=dx+ey+f \quad (3)$$

That is, by obtaining the coefficients a, b, c, d, e, and f shown in Expressions (2) and (3), the coordinates [x,y] corresponding to the respective coordinates [u,v] are calculated, whereby the image of FIG. (B) may be converted in terms of the coordinates. Here, an example of linear transformation such as affine transformation is shown. The transformation is not limited thereto. It may be another linear transformation or non-linear transformation.

After the synthesization is completed, the synthesized image is outputted to the verification portion 47, and it is collated with the facial images enrolled in advance in the facial image database 5. With respect to the verification method, matching is carried out in connection with the positional relationship of facial parts of, for example, eyes, nose, mouth, eyebrows, and facial profile, information of thickness and length, and features of grayscale information of the face. As a result of the verification, a enrolled image for which the matching degree is high, that is, a enrolled image that has a matching degree more than a fixed level is outputted to the external I/F portion 21. After that, the results thereof are displayed on the displaying unit 3.

Figure 4:
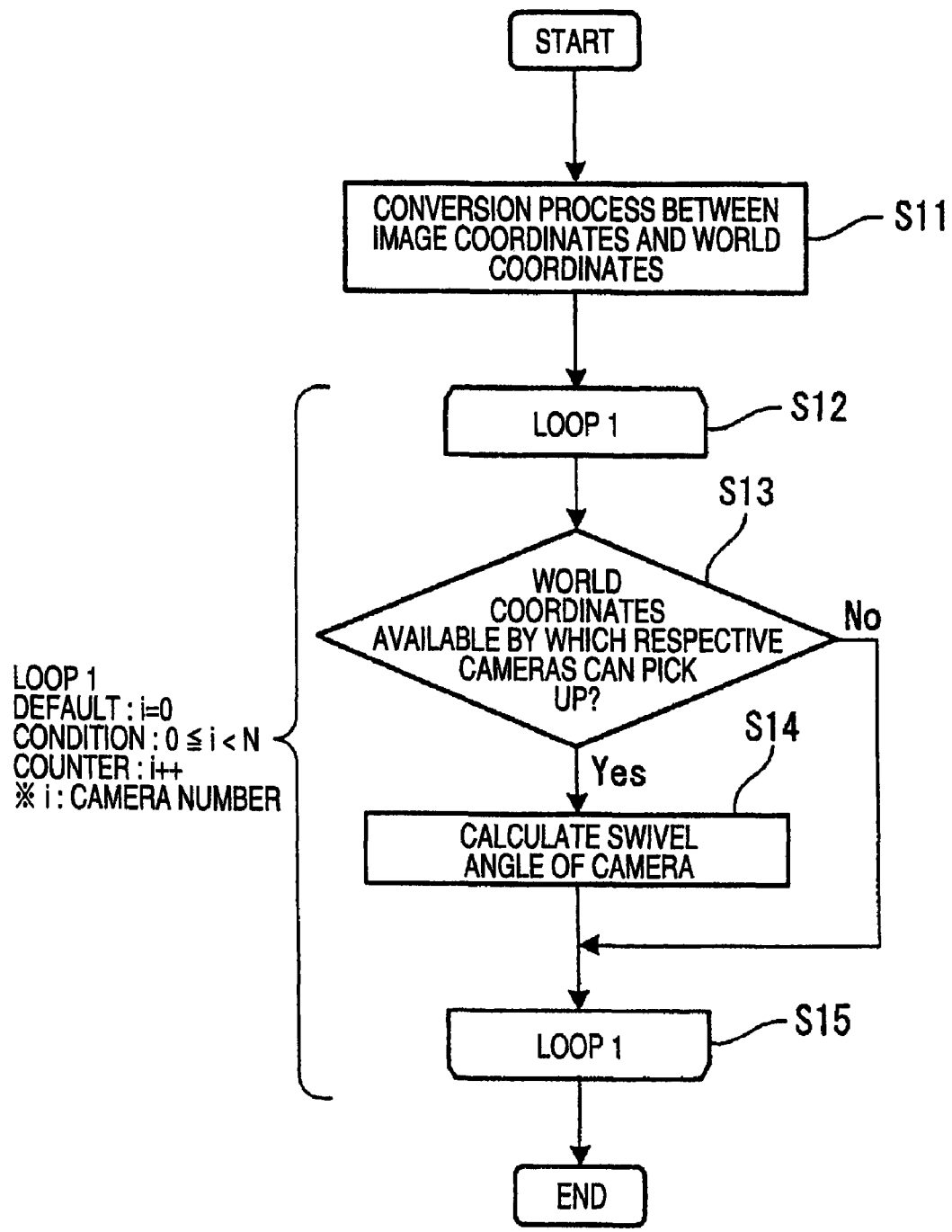
FIG. 4 is a flowchart describing operations of pickup controlling means according to the first embodiment of the present invention.

Next, a description is given of operations of the pickup controlling unit 2, using FIG. 4.

FIG. 4 is a flowchart describing the operations of the pickup controlling unit 2. First, if a person displayed on the displaying unit 3 is selected by a controller that is an external device 6, the image coordinates are inputted. The image coordinates are converted to the world coordinates which are common to all the pickup units 1 (Step S11). In the conversion process, the coefficients R11, R12, R13, R21, R22, R23, R31, R32, R33, tx, ty and tz shown in Expression (1) described above are obtained in advance, and are converted to the world coordinates. Continuously, in a loop process from Step S12 through S15, processes equivalent to the number of the respective cameras 1A through 1E as the pickup means 1, are carried out. First, it is determined whether the respective pickup units 1 are able to pick up the designated world coordinates (Step S13). This assessment is enabled by presetting the ranges photographable by the respective cameras 1A through 1E in advance. Continuously, if it is determined that the designated world coordinates can be photographed by the respective cameras 1A through 1E, the swivel angle for each of the cameras 1A through 1E is calculated so that the respective cameras 1A through 1E pick up the designated world coordinates. If it is determined that the respective cameras 1A through 1E are not able to pick up, the process is returned to Step S12 in order to carry out the process of the next pickup unit 1.

Figure 5:
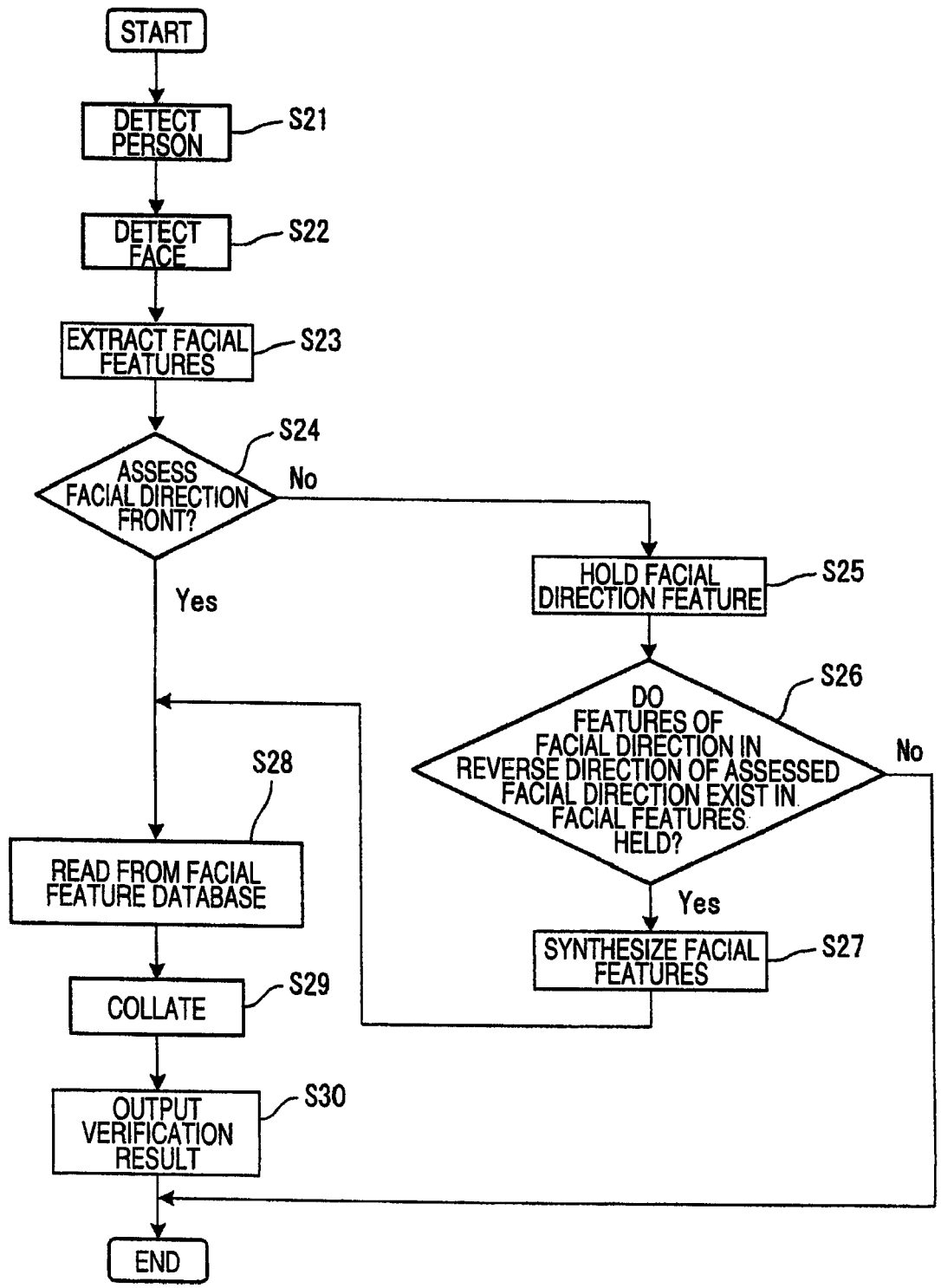
FIG. 5 is a flowchart describing operations of verifying means according to the first embodiment of the present invention.

Next, a description is given of operations of the verifying unit 4, using FIG. 5.

FIG. 5 is a flowchart describing the operations of the verifying unit 4. First, pictures are inputted from the respective cameras 1A through 1E. A process for detecting a person is carried out in regard to the pictures inputted (Step S21). Here, in regard to detection of a person, a person is determined based on that movements and changes of a picture for each of the frames, which are the minimum unit picked up by the pickup units, are captured, and an elliptical object exists above or on the movements and changes. Continuously, the face area is detected from the detected person (Step S22). Herein, face detection is determined based on, for example, whether, in a state where a plurality of facial images are enrolled in advance and the face detecting portion is caused to study the same to prepare an average face, there is an area similar to a grayscale picture of the average face (that is, whether the correlation degree is high).

Next, the facial features which are eyes, nose and mouth becoming the features of the face are extracted from the detected face area (Step S23). Extraction of facial features is determined based on whether, for example, in a state where a plurality of facial features such as the right eye, the left eye, nose and mouth are enrolled in advance and are studied to prepare average features, there is an area similar to the grayscale picture of the average features (that is, whether the correlation degree is high).

After that, the process for determining whether the face direction is the front (Step S24). With respect to assessment of the direction of the face, for example, a plurality of front face, face turned right by 45 degrees, face turned left by 45 degrees, face inclined upward by 45 degrees, face inclined downward by 45 degrees, etc., are enrolled and studied in advance, and average faces are prepared at the respective angles, wherein it is determined in which direction the face of a person is turned, based on whether the face of the person is similar to the grayscale image of the average face (that is, whether the correlation degree is high). As a result of the assessment, if it is determined that the face is turned to the front, the process for reading face data from the facial image database enrolled in advance is carried out (Step S28). Thereafter, the facial features extracted in Step S23 are collated with the facial features read from the facial image database (Step S29). With respect to the verification method, matching is carried out in connection with the positional relationship of facial parts of, for example, eyes, nose, mouth, eyebrows, and facial profile, information of thickness and length, and features of grayscale information of the face. Also, if it is determined based on the result of assessment of the front face that the face is not turned to the front, the facial features extracted in Step S23 are stored (Step S25).

Next, the facial features of the reverse direction of those extracted in Step S23 are sought from the facial features stored (Step S26). If the facial features of the reverse direction of those extracted in Step S23 do not exist in the stored facial features, the verifying process is terminated. If the facial features of the reverse direction of those extracted in Step S23 exist in the stored facial features, the facial features extracted in Step S23 and the facial features thus read are synthesized (Step S27). The synthesizing method is carried out as previously described. That is, first, the two facial images turned in the reverse direction to each other are enlarged and reduced so as to become the same magnification. After that, rotation and parallel movement are carried out for synthesization so that the feature end points of the corresponding right eye, left, right nose, left nose, right mouth and left mount of both facial images overlap each other. The rotation and parallel movement are carried out by, for example, publicly known affine transformation, etc., as described above.

After that, the process for reading face data from the facial image database enrolled in advance is carried out (Step S28). Continuously, the synthesized facial features and the facial features read from the facial image database are collated with each other (Step S29). As previously described, the verification method is carried out by matching in connection with the positional relationship of facial parts of, for example, eyes, nose, mouth, eyebrows, and facial profile, information of thickness and length, and features of grayscale information of the face. Finally, the result of the verification is displayed on the displaying unit (Step S30).

Thus, with the facial feature verification apparatus according to the first embodiment of the present invention, if surveillance staff selects a person desired to be observed, in order to pick up the person subjected to surveillance by means of a plurality of pickup units 1, it is possible to observe the pictures from various angles by means of photographable pickup units 1. In addition, if it is determined that an image picked up by specified pickup unit 1 is not suitable for verification, the image can be synthesized to an image suitable for verification, wherein the accuracy of verification can be improved since the verification is enabled by another pickup means where the verification is not successful with a single unit of pickup means 1.

Second Embodiment

Figure 6:
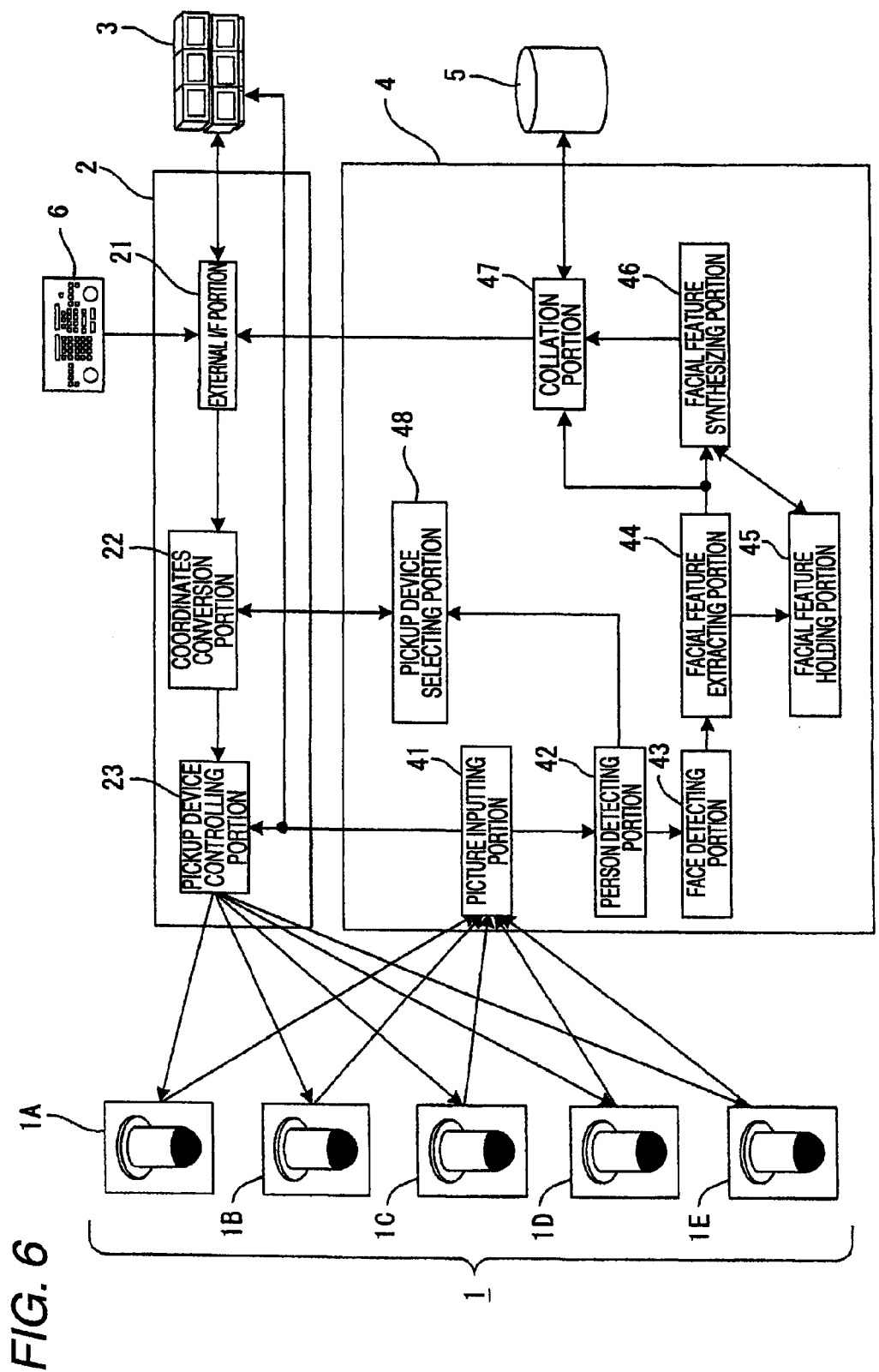
FIG. 6 is a configurational block diagram showing a facial feature verification system according to a second embodiment of the present invention.

Next, a description is given of a facial feature verification system according to the second embodiment of the present invention, using FIG. 6. Also, in the present embodiment, components that are identical to those of the first embodiment are given the same reference numerals, and overlapping description thereof is omitted.

FIG. 6 describes a configuration of a system of a facial feature verification apparatus according to the second embodiment of the present invention. A point at which the facial feature verification apparatus according to the present embodiment differs from the first embodiment is that the verifying unit 4 between the person detecting portion 42 and the coordinates conversion portion 22 includes pickup unit selecting portion 48.

In the pickup unit selecting portion 48, the input is connected to the output of the person detecting portion 42. In addition, the person detecting portion 42 is also connected to the coordinates conversion portion 22. By providing the pickup unit selecting portion 48, automatic pursuit of the person selected by surveillance staff is enabled by means of a plurality of pickup units.

Hereinafter, a description is given of the operations of the present embodiment, mainly centering around the portions differing from FIG. 1.

First, pictures picked up by (the respective cameras 1A through 1E of) the pickup units 1 are inputted into the picture inputting portion 41. Subsequently, a person is detected from the inputted pictures in the person detecting portion 42. As has been already described, in regard to detection of a person, a person is determined based on that movements and changes of a picture for each of the frames, which are the minimum unit picked up by the pickup units 1, are captured, and an elliptical object exists above or on the movements and changes. At this time, the moving direction of the person and the image coordinates on which the person exists are simultaneously detected. Next, the results of the person detection are outputted to the pickup unit selecting portion 48. The pickup unit selecting portion 48 selects photographable pickup units 1 from the pickup units 1 based on the image coordinates, which are the results of the inputted person detection. Further, simultaneously, the pickup unit 1 that has detected the person is made into the pickup unit 1 carrying out only the position detection, and the others of the photographable pickup units 1 previously selected are made into the pickup units 1 for automatic pursuit. The instruction is outputted to the next coordinates conversion portion 22, and the image coordinates are converted to the world coordinates for the pickup units 1 that carries out automatic pursuit. Then, the world coordinates are outputted to the next pickup unit controlling portion 23. After that, the swivel angle is calculated so that the respective pickup units 1 pick up the world coordinates, and the respective pickup units 1 are actuated based thereon.

The above-described operations pertain to the method for automatically pursuing a person detected by the pickup units 1. Hereinafter, a description is given of a method for automatically pursuing a person selected by an external device 6 such as a controller, etc.

First, when a person is selected from the subjects for surveillance, which are displayed on the displaying unit 3, by using the external device 6 such as a controller, etc., the image coordinates are outputted to the external I/F portion 21. Next, the image coordinates are outputted to the coordinates conversion portion 22, wherein a process of converting the image coordinates to the world coordinates comprehensible by the entirety of the facial features verification system is carried out. The conversion method is carried out by Expression (1) previously described. Continuously, the pickup unit 1 is selected, which is able to photograph the world coordinates expressing the position of the person selected by the pickup unit selecting portion 48, wherein one of the pickup units 1 is made into the pickup unit for position detection function, and the other pickup units 1 are made into the pickup units for automatic pursuit function. The instruction is outputted to the next coordinates conversion portion 22, and is converted from the image coordinates to the world coordinates for the pickup means 1 that carries out automatic pursuit, and the world coordinates are outputted to the next pickup unit controlling portion 23. After that, the swivel angle is calculated so that the respective pickup units 1 are caused to pick up the world coordinates, thereby actuating the respective pickup units 1.

Figure 7:
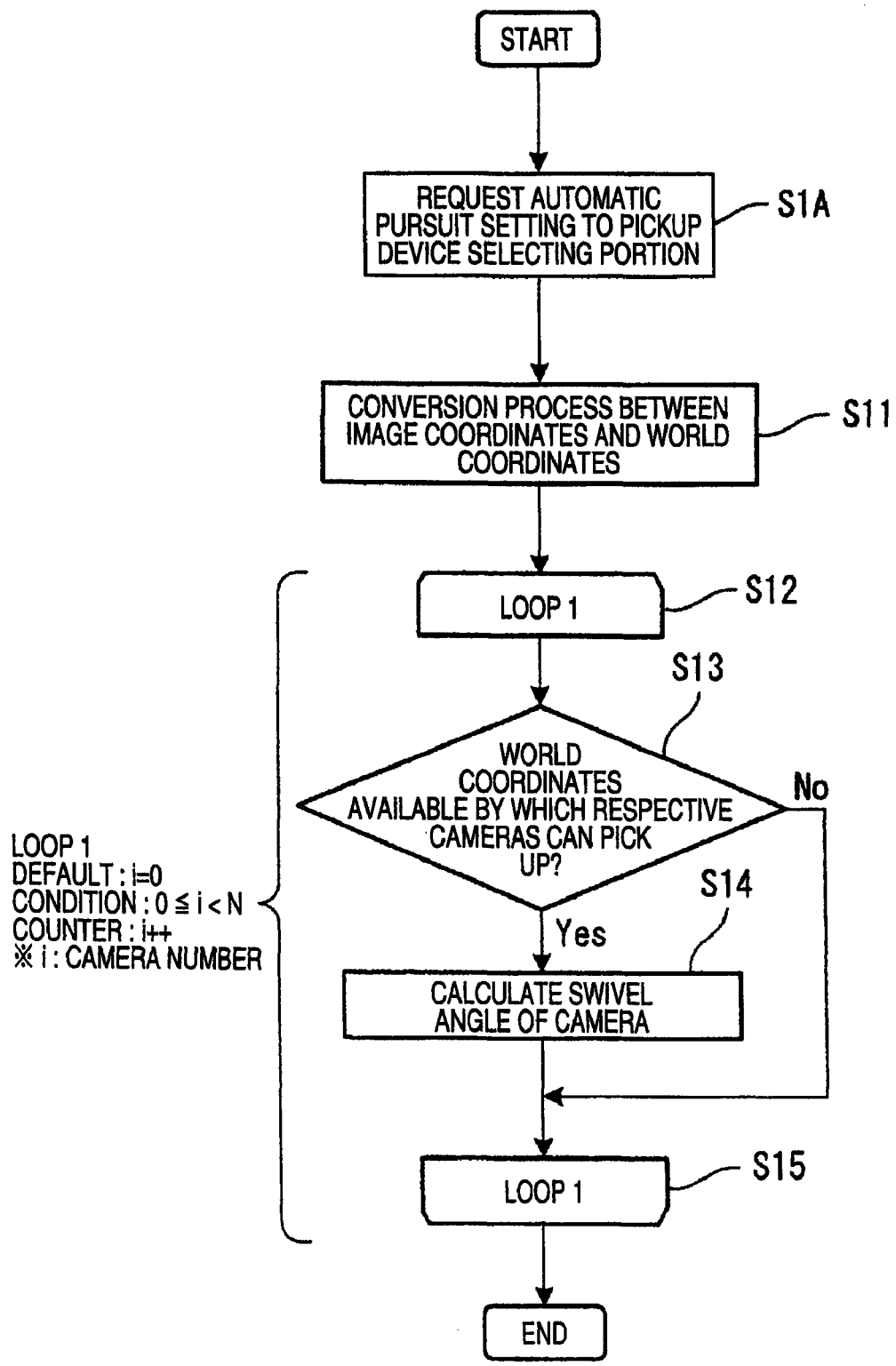
FIG. 7 is a flowchart describing operations of pickup controlling means according to the second embodiment of the present invention.

Next, a description is given of operations of the pickup controlling unit 2, using FIG. 7 which shows the flowchart describing the operations of the pickup units 1. A point at which the operational flow in the present embodiment differs from the operational flow of the pickup controlling unit 2 according to the first embodiment shown in FIG. 4 is that the former includes a request step (Step S1A) for setting an automatic pursuit for the pickup unit selecting portion 48 in FIG. 7.

Hereinafter, a description is given only of points differing from FIG. 4. First, when a person displayed on the displaying unit 3 is selected by a controller or the like that is the external device 6, the image coordinates are inputted. Subsequently, the image coordinates inputted by the controller or the like being the external device 6 are outputted to the pickup unit selecting portion 48 of FIG. 6 (Step S1A). After that, the pickup units 1 for automatic pursuit are selected, and the process is returned to the routine. The operations thereof are described in the description of the operational flow of the verifying unit 4 below. After that, the image coordinates inputted by the controller being the external device 6 are converted to the world coordinates common to the pickup units 1 that carry out automatic pursuit (Step S11). The conversion process may be carried out by acquiring in advance the coefficients R11, R12, R13, R21, R22, R23, R31, R32, R33, tx, ty, and tz shown in Expression (1) described above and converting the same to the world coordinates. The subsequent processes are similar to those in FIG. 4.

Figure 8:
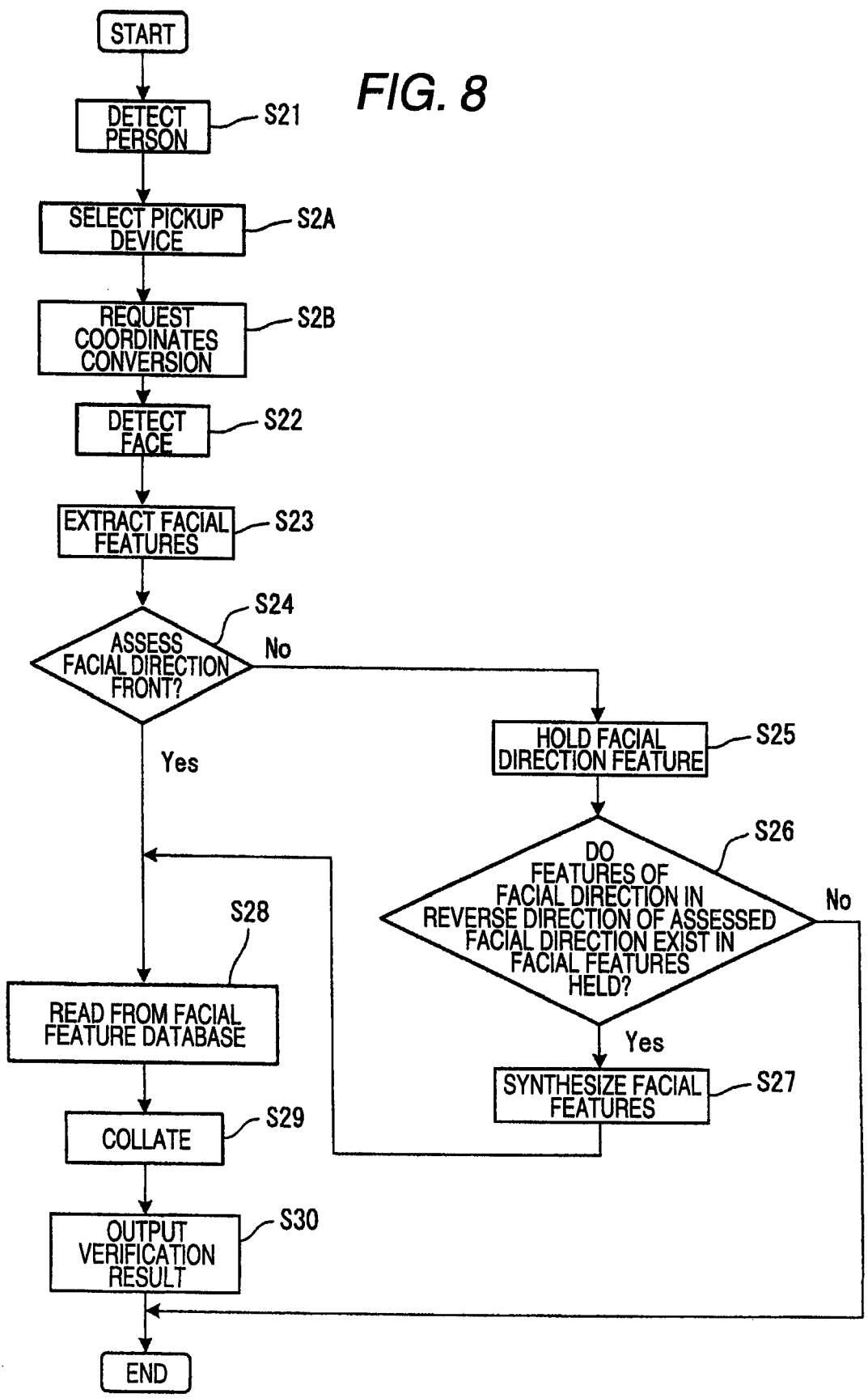
FIG. 8 is a flowchart describing operations of verifying means according to the second embodiment of the present invention.

Next, a description is given of the verifying unit 4, using FIG. 8 which is a flowchart describing the operations of the verifying unit 4. Herein, a description is given only of points different from FIG. 5.

Points at which the operational flow of the verifying unit 4 according to the present embodiment differs from that of the verifying unit 4 shown in FIG. 5 are that the former includes a step (Step S2A) of selecting the pickup unit 1 and a step (Step S2B) of requesting coordinates conversion.

First, pictures are inputted from the respective pickup units 1 into the image inputting portion 41. In the person detecting portion 2, a process for detecting a person is carried out for the pictures inputted from the image inputting portion 41 (Step S21). Herein, as previously described, in regard to detection of a person, a person is determined based on that movements and changes of a picture for each of the frames, which are the minimum units picked up by the pickup units 1, are captured, and an elliptical object exists above or on the movements and changes. Also, at this time, the moving direction of the person and the image coordinates where the person exists are simultaneously detected. Next, the pickup unit 1 is selected (Step S2A). Here, a photographable pickup unit is/are selected from a plurality of pickup units 1 based on the image coordinates which are the results of the person detection inputted. Also, simultaneously, the pickup unit 1 that has detected the person is made into the pickup unit carrying out only the position detection, and the others of the photographable pickup units previously selected are made into the pickup units for automatic pursuit. Next, the person detecting portion 42 outputs a coordinates conversion request signal to the coordinates conversion portion 22 via the pickup unit selecting portion 48 (Step S2B). The coordinates conversion portion 22 is a portion for converting the coordinates in compliance with Expression (1) previously described, and the image coordinates are converted to the world coordinates for the pickup units 1 that carry out automatic pursuit, and the world coordinates are outputted to the next pickup unit controlling portion 23. After that, the pickup unit controlling portion 23 calculates the swivel angles so that the respective pickup units 1 are caused to pick up the world coordinates, and actuates the respective pickup units 1. Subsequent processes after the face detection process (Step S22) are similar to those in FIG. 5.

Thus, with the facial feature verification apparatus according to the second embodiment of the present invention, when surveillance staff selects a person desired to be observed since a plurality of pickup units 1 continuously pick up a person subjected to surveillance, it is possible to continuously watch pictures coming from various angles by photographable pickup units 1. Further, if it is determined that an image picked up by specified pickup unit 1 is not suitable for verification, the image can be synthesized to an image suitable for verification, wherein a facial feature verification apparatus can be provided, in which such an effect can be brought about, by which the accuracy of verification can be improved where the verification is not successful with a single pickup unit.

In addition, the present invention is not limited to the above-described embodiments, and it may be embodied in various modifications and variations within the scope not departing from the spirit of the present invention.

Although a detailed description was given of the present invention with reference to the specified embodiments, it is obvious to ones skilled in the same art that the present invention may be subjected to various modifications and variations without departing from the spirit and scope thereof.

The present application is based on Japanese Published Unexamined Patent Application No. 2004-331894 filed on Nov. 16, 2004, and contents thereof are taken herein as a reference.

INDUSTRIAL APPLICABILITY

A facial feature verification apparatus according to the present invention includes a pickup controlling unit capable of controlling all of the pickup units that can pick up a person, subjected to surveillance by selecting the person, displayed on the displaying unit, and a synthesizing unit for synthesizing facial images picked up by a plurality of pickup units, and can achieve a camera surveillance system having high reliability since the accuracy of verification can be improved by enabling verification where the verification is not successful with a single pickup unit.

What is claimed is:
1. A facial feature verification apparatus, comprising:
a plurality of pickup units including a first pickup unit and a second pickup unit that differs from the first pickup unit;
a pickup controlling unit which controls the pickup units;
a displaying unit which displays images picked up by the pickup units; and
a verifying unit which verifies the picked up images with image data enrolled in advance,
wherein the verifying unit includes:
a person detecting portion which detects a first person image in the image picked up by the first pickup unit and a second person image in the image picked up by the second pickup unit;
a face area detecting portion which determines a first face area and a second face area from the detected first person image and second person image to extract a first facial image and a second facial image, respectively;
a facial feature extracting portion which extracts a first facial feature and a second facial feature from the extracted first facial image and second facial image, respectively;
a facial feature synthesizing portion which synthesizes the extracted first facial feature with the second facial feature;
a verification portion which verifies the synthesized facial feature with a facial image enrolled in advance in a facial image database; and
a facial feature holding portion which holds the extracted first facial feature, wherein a face direction determining portion determines whether the face direction of the determined second face area is not directed to the front of a pickup unit.

2. The facial feature verification apparatus according to claim 1, wherein the pickup controlling unit includes:
an external I/F portion which serves as an interface with an external device for carrying out control externally;
a coordinates conversion portion which converts an image coordinate inputted by the external device to a predetermined world coordinate; and
a pickup device controlling portion which calculates a swivel angle for actuating the pickup units.

3. The facial feature verification apparatus according to claim 1, wherein the verification portion includes a pickup unit selecting portion which selects, among the pickup units, the pickup unit for position detection, which detects a position of the detected person, and the pickup unit for pursuit, which carries out pursuit of the detected person.

4. The facial feature verification apparatus according to claim 1, further comprising: a face direction determining portion which determines face directions of the determined first and second face areas; and the facial feature synthesizing portion seeks the first facial feature from the facial feature holding portion, and checks whether the face direction of the second facial feature is opposed in direction to the face direction of the first facial feature, and synthesizes the extracted second facial feature with the first facial features opposed in direction.

5. A facial feature verification method, comprising: providing a plurality of pickup units including a first pickup unit and a second pickup unit that differs from the first pickup unit, a pickup controlling unit which controls the pickup units, a displaying unit which displays images picked up by the pickup units, and a verifying unit which verifies the picked up images with image data enrolled in advance; detecting a first person image in the image picked up by the first pickup unit and a second person image in the picked up images image picked up by the second pickup unit; determining a first face area and a second face area from the detected first person image and second person image to extract a first facial image and a second facial image, respectively; extracting a first facial feature and a second facial feature from the extracted first facial image and second facial image, respectively; synthesizing the extracted first facial feature with the second facial feature; verifying the synthesized facial feature with a facial image in a facial image database enrolled in advance; and holding the extracted first facial feature, wherein a face direction determining portion determined whether the face direction of the determined second face area is not directed to the front of a pickup unit.

6. The facial feature verification method of claim 5, further comprising: determining a face direction of the determined first face area and a face direction of the determined second face area; holding the extracted first facial feature; seeking the first facial feature; checking whether the face direction of the second facial feature is opposed in direction to the face direction of the first facial feature; and synthesizing the extracted second facial feature with the first facial features opposed in direction.

7. A non-transitory recording medium on which is stored a program for facial features verifying operations to cause a computer to carry out the steps of: providing a plurality of pickup units including a first pickup unit and a second pickup unit that differs from the first pickup unit, a pickup controlling unit which controls the pickup units, a displaying unit which displays images picked up by the pickup units, and a verifying unit which verifies the picked up images with image data enrolled in advance; detecting a first person image in the image picked up by the first pickup unit and a second person image in the picked up images image picked up by the second pickup unit; determining a first face area and a second face area from the detected first person image and second person image to extract a first facial image and a second facial image, respectively;

extracting a first facial feature and a second facial feature from the extracted first facial image and second facial image, respectively; synthesizing the extracted first facial feature with the second facial feature; verifying the synthesized facial feature with a facial image in a facial image database enrolled in advance; and holding the extracted first facial feature, wherein a face direction determining portion determined whether the face direction of the determined second face area is not directed to the front of a pickup unit.

8. The non-transitory recording medium of claim 7, further causing the computer to carry out the steps of: determining a face direction of the determined first face area and a face direction of the determined second face area; holding the extracted first facial feature; seeking the first facial feature; checking whether the face direction of the second facial feature is opposed in direction to the face direction of the first facial feature; and synthesizing the extracted second facial feature with the first facial features opposed in direction.

* * * * *